Aug. 1, 1944.   G. ANNESLEY   2,354,656
DRILL BIT
Filed Jan. 5, 1942   3 Sheets-Sheet 1
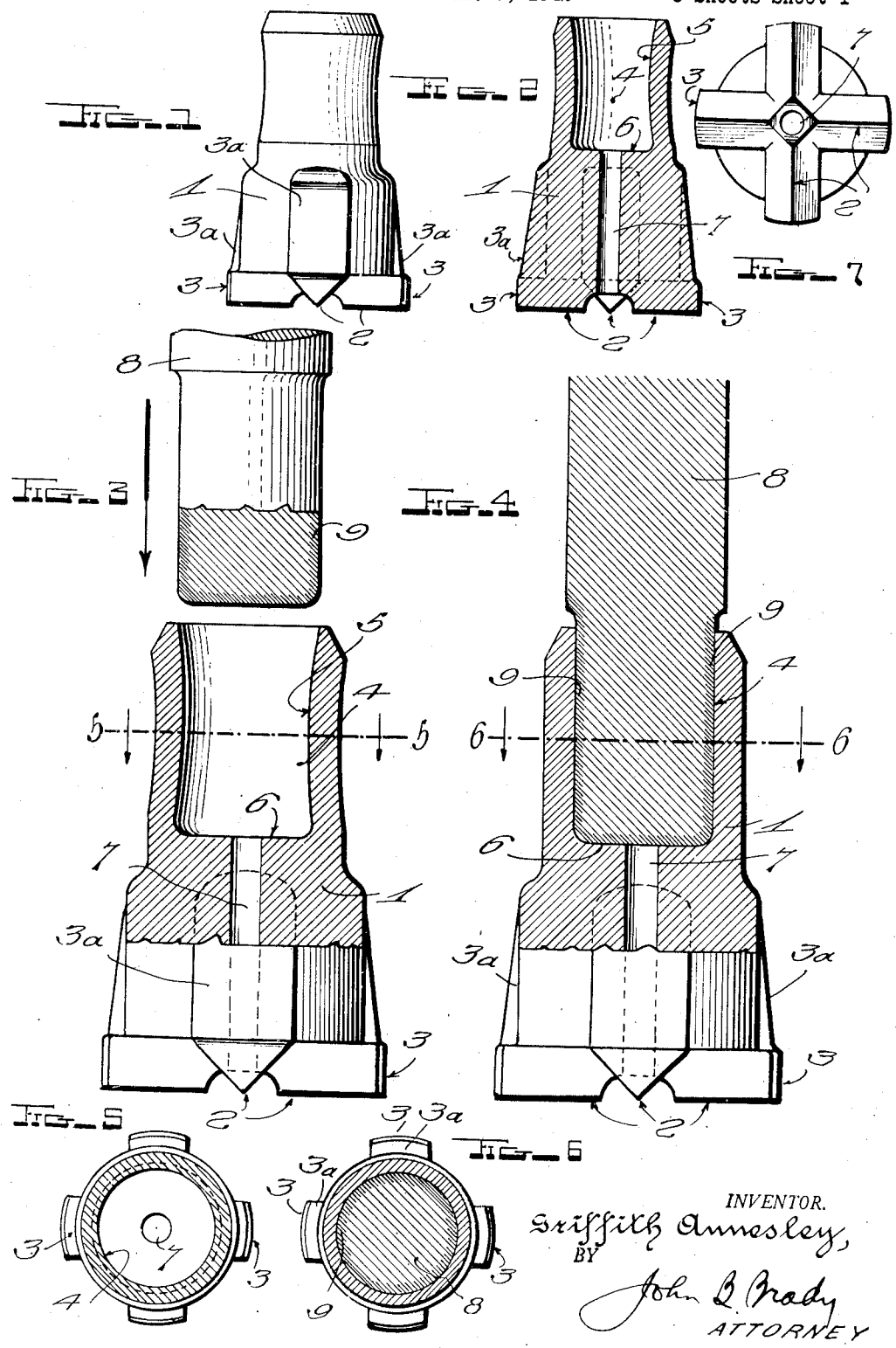
INVENTOR.
Griffith Annesley,
BY John B. Brady
ATTORNEY Aug. 1, 1944.  G. ANNESLEY  2,354,656
DRILL BIT
Filed Jan. 5, 1942  3 Sheets-Sheet 2
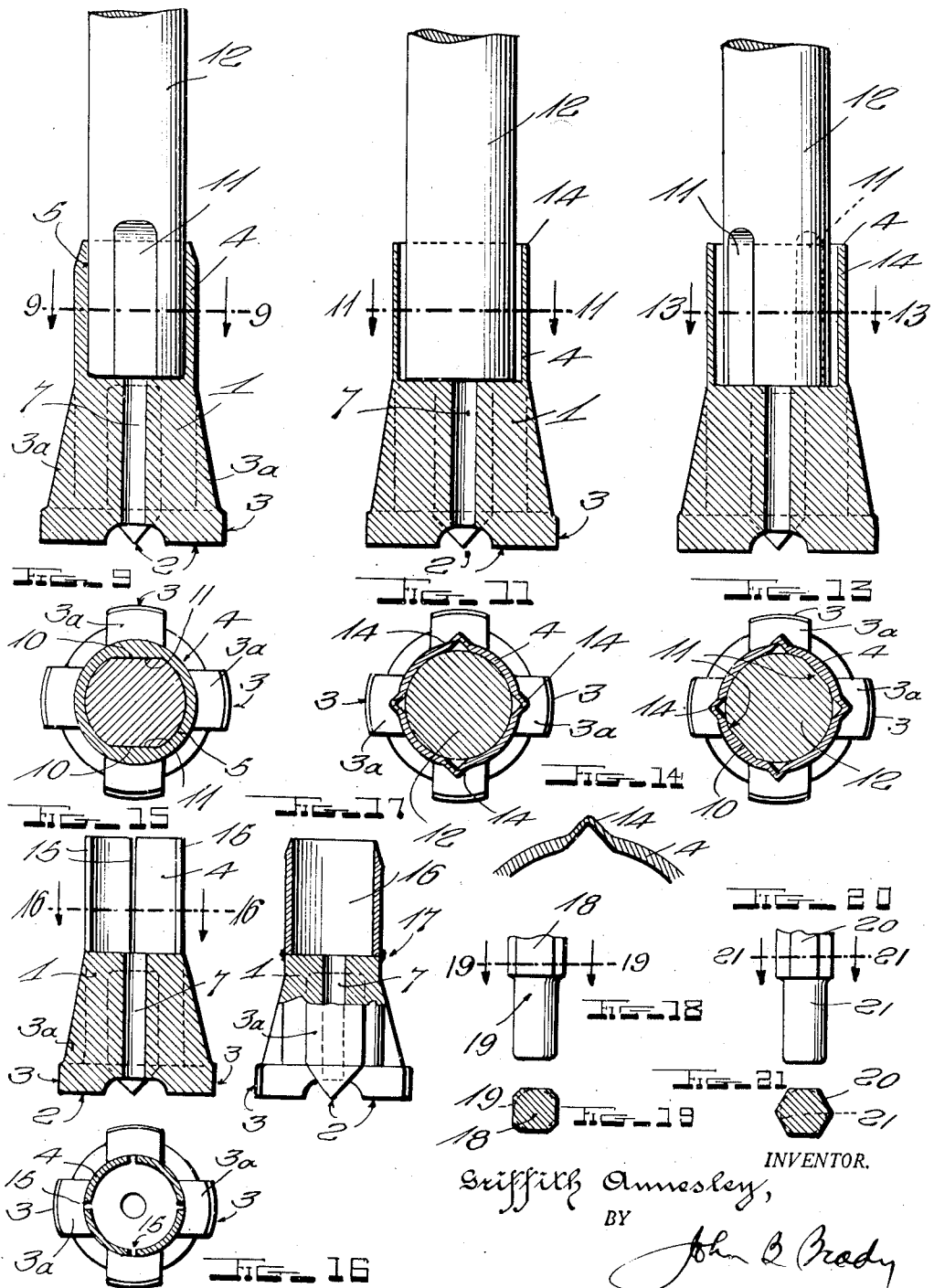
INVENTOR.
Griffith Annesley,
BY
John B. Brady
ATTORNEY Aug. 1, 1944.     G. ANNESLEY     2,354,656
DRILL BIT
Filed Jan. 5, 1942     3 Sheets-Sheet 3
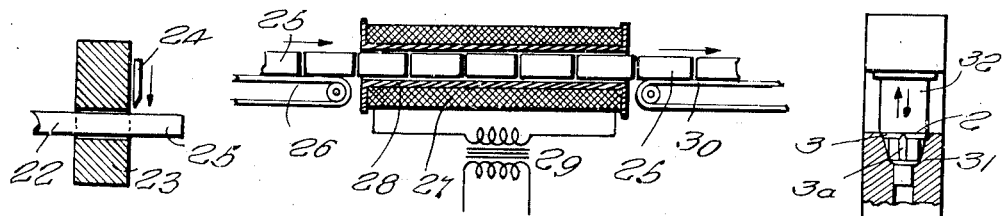
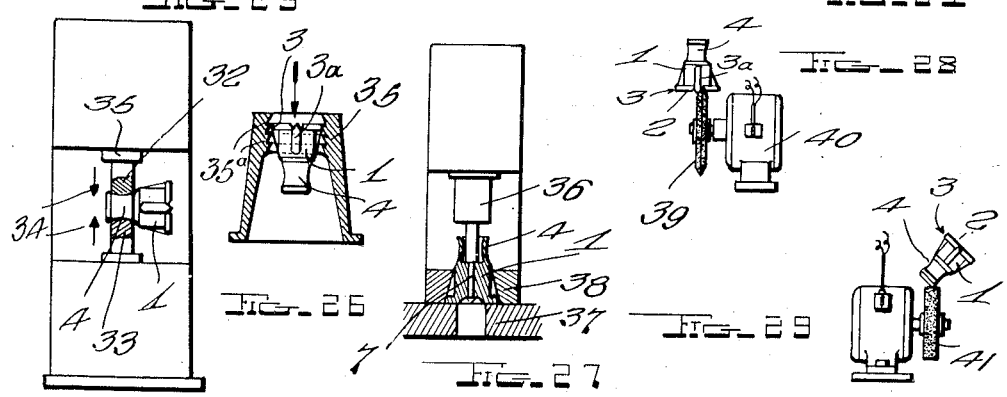
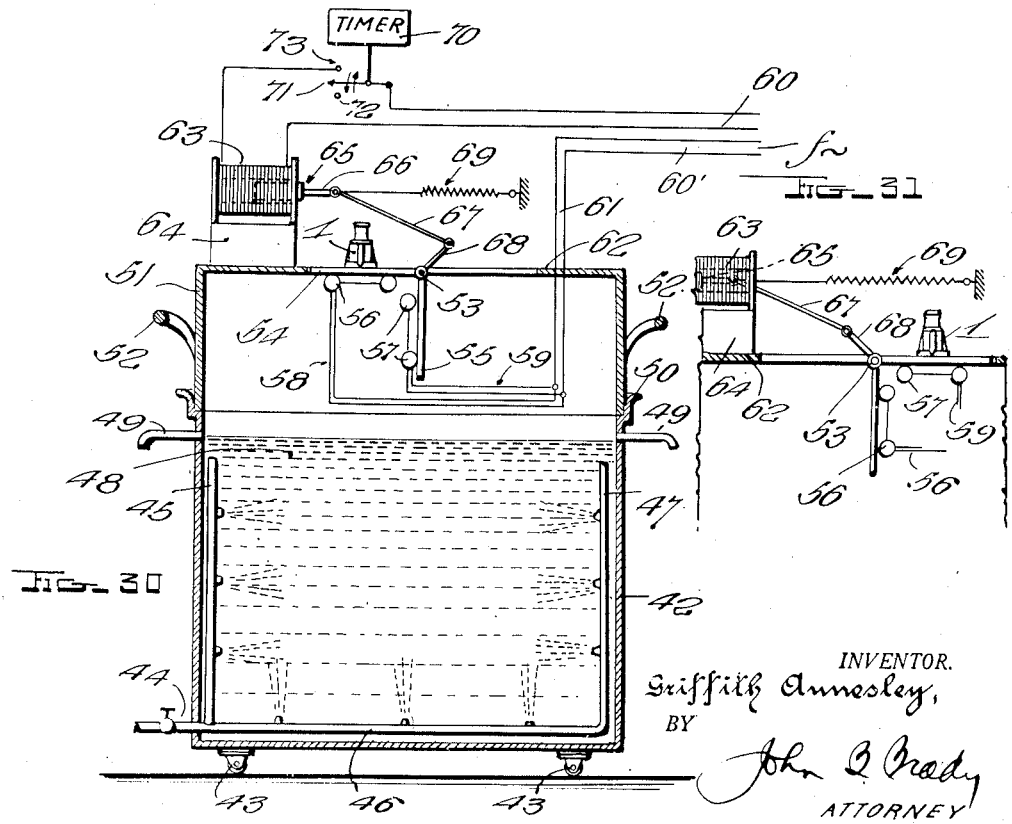
INVENTOR.
Griffith Annesley,
BY
John B. Brady
ATTORNEY Patented Aug. 1, 1944

2,354,656

UNITED STATES PATENT OFFICE 2,354,656

DRILL BIT

Griffith Annesley, New York, N. Y.

Application January 5, 1942, Serial No. 425,693

7 Claims. (Cl. 287—126)

My invention relates broadly to tools and more particularly to a construction and method of manufacturing drill bits for percussive drilling.

One of the objects of my invention is to provide a construction of drill bit for percussive drilling which is capable of quantity production at relatively low cost and which may be reforged numerous times for resharpening the drill.

Another object of my invention is to provide a construction of percussive drill having a case-hardened drill head and a relatively deformable socket portion in which the end of a hardened drill rod may be introduced and retained by intimate contact between the walls of the socket and the end of the drill rod.

Still another object of my invention is to provide a method of manufacturing drill bits and their associated drill rods in which the drill bit is so treated that the socket portion thereof is relatively yieldable while the end of the drill rod is relatively hard whereby upon introduction of the end of the drill rod into the socket of the drill bit a reliable connection is maintained under the severe conditions of shock vibration to which the type of drill of my invention is continuously subjected.

A further object of my invention is to provide a method of induction heating for preparing both the drill bit and the drill rod for interconnection in a manner which may be relied upon under severe conditions of shock vibration to which percussive drills of the type of my invention are subjected.

A still further object of my invention is to provide a method of forming the socket portion of a drill bit with internal convex annular wall surfaces which are relatively deformable against the hardened end of a drill rod for establishing an intimate connection therewith.

Other and further objects of my invention reside in the method of producing drill bits and drill rods for heavy duty percussive drilling as set forth more fully in the specification hereinafter following by reference to the accompanying drawings, in which:

Figure 1 is a side elevation of the percussive drill bit of my invention before introduction of the end of the drill rod; Fig. 2 is a longitudinal sectional view through the drill bit and illustrating the convex annular contour which is imparted to the internal surface of the socket of the drill bit for insuring the intimate interconnection between the drill rod and the socket of the drill bit; Fig. 3 is a view illustrating in section the manner of introducing the hardened end of the drill rod into the deformable socket of the drill bit; Fig. 4 is a longitudinal sectional view showing the coaction of the hardened end of the drill rod with the deformable socket of the drill bit; Fig. 5 is a horizontal sectional view through the drill bit taken on line 5—5 of Fig. 3 with the drill rod removed; Fig. 6 is a transverse sectional view through the drill rod and socket of the drill bit on line 6—6 of Fig. 4; Fig. 7 is a plan view looking in the direction of the cutting edges of the drill bit; Fig. 8 is a longitudinal sectional view taken through a drill bit and drill rod showing a modified form of connection embodying the principles of my invention; Fig. 9 is a horizontal sectional view taken on line 9—9 of Fig. 8; Fig. 10 is a vertical sectional view through a drill bit and illustrating the end of the drill rod in side elevation and showing a further modified form of connection between the drill bit and drill rod; Fig. 11 is a horizontal sectional view taken on line 11—11 of Fig. 10; Fig. 12 is a vertical sectional view through a further modified form of drill bit illustrating connection means between the end of the drill rod and drill bit constituted by a composite of the structural features set forth in Figs. 8 and 10; Fig. 13 is a horizontal cross sectional view taken on line 13—13 of Fig. 12; Fig. 14 is a fragmentary sectional view through a portion of the wall structure of the socket of the drill bit of the types illustrated in Figs. 10-13, inclusive; Fig. 15 is a vertical sectional view showing a further modified form of drill bit and socket embodying my invention; Fig. 16 is a transverse sectional view taken on line 16—16 of Fig. 15; Fig. 17 is a longitudinal sectional view of a drill bit partially illustrated in side elevation and showing a further modified construction of drill bit embodying my invention; Fig. 18 is a view of the end of a drill rod of polygonal section hardened to form a non-yieldable connection with the drill bit; Fig. 19 is a transverse sectional view taken on line 19—19 of Fig. 18; Fig. 20 is a fragmentary elevational view of the end of a drill rod of hexagonal section which is hardened in accordance with my invention; Fig. 21 is a horizontal section taken on line 21—21 of Fig. 20; Figs. 22-21 show successive steps in the method of manufacturing the drill bit of my invention as will be hereinafter described in detail and in which Fig. 22 shows the cutting of a slug from the stock; Fig. 23 illustrates the electrical heat treatment to which the slugs are subjected for raising the slugs to forging temperature; Fig. 24 illustrates the forging operation for shaping the cutting edges of the drill bit; Fig. 25 illustrates the die pressing operation for forming the circular convex socket of the drill bit; Fig. 26 illustrates the gauging operation for selecting the forged drill bits according to proper size; Fig. 27 illustrates the punching operation for forming the drill bit; Fig. 28 illustrates the rough grinding operation for forming the cutting edges of the drill bit; Fig. 29 illustrates the finished grinding operation for forming the drill bit; Fig. 30 illustrates the electrical heating and quenching step for treating the drill bit and showing one portion of the quench tank mechanism for heat treating one drill bit while an earlier heat treated drill bit is quenching; and Fig. 31 illustrates the quench tank mechanism in position for heat treating the succeeding drill bit while the drill bit illustrated in position in Fig. 30 is being quenched.

My invention is directed to the construction of drill bits and supporting means therefor capable of quantity production at relatively low cost and in which the life of the drill bit is considerably extended over structures heretofore available. It is possible with the drill bit of my invention to reforge the head of the bit from time to time within a range of approximately 24 to 30 times without losing material which would ordinarily be lost in grinding or hot milling.

In the structure of my invention the drill head of the bit is provided with substantially longer wing sections than is ordinarily provided in drilling heads together with an integrally formed socket which is so formed that the material constituting the said socket thereof is expansively and elastically deformable for frictionally engaging the end of an insertable hardened non-deformable drill rod.

In the drill and bit construction of my invention, I construct the bit with a socket of deformable material and harden the drill rod so that the surface of the drill rod is substantially non-deformable. The end of the drill rod is case hardened while the core thereof remains relatively soft to form a substantially vibration resisting end for the drill rod. That is to say, the case hardened surface of the drill rod is cushioned against the relatively soft core of the drill rod so that after connection is established with the deformable socket of the bit, vibration to which the drill is continuously subjected does not have a tendency of breaking or severing the drill rod. One of the methods I have found desirable for treating the drill rod preparatory to its use in connection with the deformable socket of the drill is to subject the end of the drill rod after finished machining, to an induction field of high frequency electrical currents tending to heat the skin or peripheral portion of the end of the drill rod. The induced high frequency electrical field has the tendency of heating the outside or peripheral portion of the outside of the drill rod faster than the core thereof so that by correct timing it is possible to bring the skin or peripheral portion to the desired degree of hardness. The eddy currents heat just the skin of the end of the drill rod, leaving the core in the same natural state as the remainder of the rod, that is to say, unhardened. I have found that this cycle of operations can be timed exactly so that the thickness of the hardened surface may be controlled to the desired depth.

Because substantial extra steel body of high carbon or alloy steel is provided in the structure of the drill bit, considerable reuse of the drill bit is possible as hereinbefore pointed out in the order of approximately 24 to 30 times. That is to say, the body of steel between the cutting edges and the base of the socket is sufficient to allow resharpening and reforging a large number of times and sufficiently long to allow the bit to be gripped in the forging machine when resharpening so that the socket is not deformed in this operation as would be the case in a normal bit not having this extra amount of steel. The modern trend of drilling practice is to start with as small a bit as possible in order to substantially increase drilling speed and conserve power consumption. With the method I employ for sharpening by forging or reshaping operations it is possible to use the smallest desirable gauge of starter bit and after it is worn to bring it back to its original size by reforging. I employ longitudinally extended wing sections so that in resharpening by reforging only the worn edge sections require to be forged back until they are sharp. By employing these longer wing sections which are already formed to correct shape and section resharpening may easily be completed in one heat, as distinguished from the condition in which the body of the bit has to be reforged and reshaped to the requisite wing section from the normal section of the steel as normally employed.

One of the methods of obtaining the deformable socket of the bit is to subject the cutting edges of the bit to the influence of a high frequency field for treating the material of the bit while permitting the material of the socket to remain in its original state, that is, relatively cold. One of the methods I employ for heat treating the bit either in manufacture or after reforging is to position the bit adjacent a high frequency electrical field and subject the cutting edges to a timed period of high frequency inductive heating so that the teeth or cutting edges are brought to the desired temperature within a period of a few seconds and then subjecting the said teeth or cutting edges to a water quench. By this method while the cutting edges are hardened the body remains cold. By this method there is no radical change in the grain structure and hardness of the bit at a certain line of demarcation as said structure merges gradually from the hardened cutting edges into the body structure.

One of the methods I employ in producing the convex annular surfaces within the socket of the bit is to introduce a mandrel into the forged socket while the socket is hot. This mandrel may be circular in section or shaped in complementary form with respect to the inner contour of the socket ultimately required. The section of the mandrel is uniform from the extremity thereof to that portion thereof displaced from the end which is employed for shaping the external end of the socket. The mandrel forms a support against which the material of the socket may be rolled while the mandrel is inserted to its limit within the socket; or the external portions of the socket may be pressed at its center by coacting externally gripping dies. Either of these operations result in the deformation of the material of the socket, rendering the inner surfaces of the socket convex and ready to receive the hardened non-deformable end of the drill rod. In the operation which produces the convex curved annular surface within the socket, the mandrel coacts with the surface of the socket. When correctly designed the amount of internal convection of the socket is such that upon introduction of the end of the hardened non-deformable drill, the inside of the socket deforms or distorts so that the amount of convex distortion becomes parallel, gripping the hardened end in intimate contact. In the final construction the material of the socket becomes actually stretched in intimate contact with the non-deformable end of the drill rod, so that the removable, hardened, non-deformable end of the drill rod is gripped over the length of the socket by spring friction until its sides are virtually parallel. The socket becomes substantially an annular spring gripping the sides of the non-deformable drill rod by spring friction.

I may employ several modifications of the convex annular surface structure of the socket of the bit. For example, I may provide diametrically opposed internal flattened surfaces in the socket which coact with complementary shaped flattened portions on the end of the drill rod. I may so construct the socket of the bit that longitudinally extending ribs or folds of reduced section are disposed at spaced intervals about the periphery of the socket for imparting resiliency or expansibility to the socket for insuring a substantial grip between the socket and the end of the drill rod. I may provide longitudinally extending slits in the socket so that the end of the drill rod when forced into the socket establishes a substantial grip with respect thereto.

In the several forms of my invention, the reaming edges of the oppositely extending wings fall within a substantially cylindrical outline with the sides parallel. The sides remain substantially parallel throughout the cutting life of the tool, allowing gauge changes of $\frac{1}{32}$ of an inch, which, especially with a lot of holes, allows a much smaller starting drill to be used with consequential increased drilling speed. I may employ a construction of drill bit in which the head is formed from abrasive resisting alloy steel, while the socket is formed from yieldable metal. The connection between the two is made by abutting or flash winding or one of the non-ferrous brasing methods such as the copper hydrogen process.

Varying sections of the drill rods such as square, quarter-octagon, hexagonal, etc may be used after simple preparation by turning. In previous practice it has been necessary to provide a conforming shape of socket for a particular section of drill rod, such as quarter-octagon for a quarter-octagon drill rod, etc. In the structure of my present invention any type of drill rod may be used to conform with one type of socket as all shanks irrespective of their section are prepared for the standard socket by simple turning. The invention involves a new method of attaching a removable drill bit with a drill rod, the basis of which is a non-deformable drill rod and a deformable socket. Drills of this type are generally employed in drilling rock or minerals and involve considerable wear under shock vibration by percussive drilling.

In previous types of socket bits employing a rod and socket connection there is a tendency under constant hammering to expansion. In the structure of my invention, the hardened end of the drill rod cannot expand under excessive pounding action when in the socket, thus eliminating the tendency to burst the walls of the socket.

Referring to the drawings in more detail, reference character 1 designates the body structure of the drill bit having integrally formed radially extending cutting faces 2. The cutting faces 2 all terminate in substantially cylindrical side portions 3 which are straight up and down or disposed vertically for gauging the hole which is formed by the drill bit. The cutting faces each taper from the relatively cylindrical side portions 3 toward the body structure of the drill bit 1, forming wing portions designated at 3a. The upper portion of the body structure of the drill bit includes the socket 4. The inner annular surface is slightly convex as represented at 5. The base of the socket at 6 is substantially spaced from the cutting faces 2 of the drill bit by the interposition of the extra steel body in the structure of the drill bit. This extra steel body disposed between the base of the socket 6 and the cutting faces 2 permits regrinding and reforging of the drill bit a large number of times as hereinbefore pointed out. A central bore 7 is punched through the body structure of the drill bit. The drill rod 8, the end of which is introduced into the socket 4, has the surface thereof hardened by treatment in a high frequency electrical field. The hardened peripheral surface portion of the end of the drill rod 8 is represented at 9. The end of the drill rod 8 is substantially non-deformable. The socket 4 of the drill bit is, on the other hand, deformable so that the end of the drill rod 8 is forced against the convex annular surface 5 of the socket 4. The deformable surface 5 of the socket 4 tends to grip the non-deformable end of the drill rod 8, thereby establishing an intimate interconnection between the end of the drill rod and the drill bit. The drill bit has the cutting edges 2, their side portions 3 and the wing portions 3a treated in a high frequency electrical field which is confined to the body portion 1 of the drill bit for hardening these portions while the socket portion remains relatively soft and is deformable for gripping the non-deformable end of the drill rod. Three space zones of gripping force are established at spaced intervals along the non-deformable end of the drill rod 8 by reason of the tendency of the deformable wall 5 of the socket 4 to grip the non-deformable end of the drill rod 8 substantially in the center and also the base of the socket and at the entrance of the socket. That is to say, as the hardened end of the non-deformable drill rod 8 forces the material of the deformable socket outwardly along a central zone, the material of the socket is forced inwardly at the base and at the entrance of the socket, thereby establishing an intimate connection between the socket and the drill rod.

I may employ other arrangements for uniting the drill rod and drill bit. In Figs. 8 and 9 for example, I have illustrated the socket portion 4 of the drill bit as having a substantially cylindrical inner wall surface formed in an annular convex curve 5 as explained in connection with Figs. 1–7, and in addition the socket 4 is provided with a pair of opposed flattened surfaces 10. These flattened surfaces 10 coact with corresponding flattened surfaces 11 formed in the end of drill rod 12. Thus the drill bit is prevented from rotating with respect to the end of the drill rod and the drill bit is retained on the drill rod by virtue of the deformable material of the socket 4 and the tendency thereof to intimately grip the non-deformable end of the drill rod 12 in at least three annular zones as heretofore explained.

In order to increase the deformable characteristics of the socket of the drill bit, I may employ the construction illustrated in Figs. 10–12, in which the section of the wall constituting the socket 4 is reduced in diametrically opposite positions indicated at 14. The portions of the wall structure of reduced section illustrated at 14 are somewhat outstruck and form substantially vertically extending ribs as illustrated. These ribs are in the nature of folds and have a slightly bellows-like action which permits slight stretching of the socket upon introduction of the non-deformable end of the drill rod. The deformable characteristic of the socket 4 is such that the non-deformable end of the drill rod 12 is firmly gripped for spreading the drill bit under conditions of percussive drilling. As illustrated more clearly in Fig. 14, the reduced section of the wall structure of the socket 4, shown at 14, is substantially V-shaped, with the upper surface of the V directed toward the surface of the drill rod permitting a somewhat hinge-like yielding action of segments of the wall as the socket spreads upon insertion of the end of the drill rod 12.

I may combine the features explained in connection with the structures disclosed in Figs. 8–11 as shown in the arrangement of Figs. 12 and 13. That is, the socket 4 may be provided with the diametrically opposite flattened surfaces 10 which coact with diametrically opposite flattened surfaces 11 on the hardened end of the drill rod 12, and in addition the longitudinally extending ribs or folds 14 may be provided for imparting yieldability to the socket 4, at the same time that the end of the drill rod is obstructed against rotation within the socket of the drill bit.

I may also employ a structure as illustrated in Figs. 15 and 16, in which the socket 4 contains vertically extending slots 15 which enable the segments of the socket 4 to yield with respect to the end of the drill rod and frictionally grip the drill rod in binding relation.

I may also construct the drill bit in the manner set forth in Fig. 17, in which the body structure 1 of the drill bit may be forged from abrasive resisting alloy steel, while the socket portion of the drill bit is formed from yieldable metal represented at 16. The yieldable metal socket structure is wholly independent from the forged body structure 1 and is welded thereto by a suitable welded joint represented at 17. In this arrangement, the body structure of the drill bit is hardened by high frequency electrical treatment or by any other heat treatment process, while the socket 16 remains yieldable and deformable for gripping then end of the non-deformable drill rod.

The structure of drill bit of my invention is applicable for operation with all available types of drill rods. For example, as illustrated in Figs. 18 and 19, a drill rod of polygonal sections represented at 18 may be employed with the end thereof reduced to cylindrical section as represented at 19 and hardened to render the end of the rod substantially non-deformable.

I may employ a drill rod of hexagonal section as represented at 20 in Figs. 20–21, with the end of the drill rod reduced to cylindrical section as indicated at 21 and hardened to render the drill rod substantially non-deformable for introduction into the socket of the drill bit.

The several structures I have described herein are all produced by a succession of method steps which I have developed for the efficient production of drill bits on a quantity basis at relatively low cost. These successive steps are shown in Figs. 21–31, inclusive.

Referring to Fig. 29, I have shown the stock material 22 being moved through an anvil 23, adjacent which a shear 24 operates for cutting slugs from the stock material as represented at 25, which are then moved on a suitable conveyor 26 shown in Fig. 23, through a high frequency electrical furnace. The high frequency electrical furnace is illustrated schematically as comprising an inductive winding 27 wound upon a suitable coil support 28, providing an air core through which the slugs 25 are advanced. The winding 27 is connected to a suitable energizing circuit illustrated schematically at 29. The slugs, raised to forging temperature, are delivered to conveyor 30 from which the slugs are fed to the forging press illustrated schematically in Fig. 24. I have shown a forging die at 31 against which the slug 25 is pressed by action of the vertical press 32 for forming the cutting edges 2, curved sides 3, tapered wings 3a, and otherwise shaping the slug.

In Fig. 25 I have shown the step of imparting the convex annular inner surface to the socket of the drill bit. A press having a pair of coacting shaping dies 32 and 33 as represented in Fig. 25 is employed to exert pressure against the outside walls of the socket of the forged drill bit. Forces are directed against the outside walls of the socket of the drill bit in the directions indicated by arrows 34 under pressure of moving head 35 of the press shown in Fig. 25. This operation tends to press the material of the socket along a central transverse zone inwardly, while the material of the socket at the base and extreme end thereof is relatively undisturbed. Thus the convex inner wall of the socket is prepared for receiving the drill rod, as more clearly shown in Figs. 2 and 3.

In Fig. 26 I have shown a gauging ring through which the forged drill bit must pass if the manufacturing steps thus far explained have been properly carried out.

The gauge ring is illustrated at 35 through which the shaped diametrically opposite ends 3 of the cutting faces 2, constituting the largest diameter of the drill bit must pass. This gauge may have broach-like internally arranged teeth 35a so that the operations of flash removal and gauging can be done at one operation.

In Fig. 27 I have shown the step of punching the center hole 7 through the drill bit. The press 36 is employed for operating a tool which pierces the forged drill bit indicated at 1, which is secured in position on bed plate 37 by suitable securing means 38.

The forged drill bit is now ready for rough grinding and shaping of the cutting edges 2, which step is carried out by a siutable V-shaped grinder designated at 39, operated by suitable motor 40 by which cutting edges of the drill bit may be sharpened.

The fine finishing of the drill bit is carried out upon a suitable grinder as represented in Fig. 29, in which grind wheel 41 is employed for finishing the cutting edges and bevelling the peripheral edge of the socket of the drill bit.

The drill bit is now ready for the heating and quenching operation which is illustrated more clearly in Figs. 30 and 31. A tank 42 mounted on suitable casters 43 may be moved to a position most suitable for cooperation with the forging or reforging steps. The tank 42 is filled with cold water at approximately 50° F. from supply line 44, and distributed and circulated through suitable pipe system 45, 46 and 47 within the tank for thus agitating the fluid bath designated at 48. Suitable overflow pipes 49 are provided for limiting the depth of the water in the tank. The upper periphery of the tank 42 is provided with a channel 50 into which the open end of the removable top portion 51 is adapted to fit. Suitable handles 52 are provided for removing the top 51 as required. The top 51 is provided with a transversely extending shaft member 53 about which a pair of shelf members 54 and 55 are mounted substantially normal to each other. Each shelf member has a high frequency heating coil carried by its lower surface for inductively heating the cutting edge portions and wing extensions of a drill bit which may be disposed on the top of the respective shelves. That is to say, shelf 54 has a heating winding 56 mounted beneath the shelf while shelf 55 has heating winding 57 mounted beneath the shelf 55. These heating windings may be continuously energized through flexible connections indicated at 58 and 59 and which lead to the power supply circuit 60' through suitable connections 61.

The shelf members 54 and 55 are so mounted with respect to shaft 53 and the horizontally extending shelf-like support 62 of the top section 51 that the shelves 54 and 55 are alternately shifted into alignment with the plane of the shelf-like support 62. The mechanism for accomplishing this operation is schematically shown as comprising solenoid 63 mounted on a suitable base 64 carried by shelf-like support 62. Solenoid 63 operates upon armature 65 which pivotally connects through link 66 with link 67 which is in turn pivotally connected to arm 68 which controls the position of shelves 54 and 55. Linkage 66—67 is normally biased by means of spring 69 so that shelf 54 is in a plane with shelf-like support 62 and ready to receive a forged drill bit preparatory for inductive heating. The forged drill bit is disposed upon shelf 54 and is retained thereon for a time period sufficient to harden the cutting edges of the drill bit. This time period is determined by operation of timer 70 which moves switch arm 71 alternately from open contact 72 to contact 73 for periodically energizing solenoid winding 63. The timer maintains the switch arm 71 on open contact 72 for a sufficient time period to insure complete inductive heating of the cutting edges 2, side portions 3 and tapered wing portions 3a of the forged drill bit. Arm 71 is then moved to contact 73 thereby connecting power supply 60 with solenoid winding 63 and attracting armature 65 against the action of spring 69. Linkages 66 and 67 then shift arm 68 for moving shelf 55 to the position illustrated in Fig. 31. Shelf 55 is now ready for the deposit of a forged drill bit preparatory for heat treatment, while the drill bit originally deposited on shelf 54 has been dropped into the fluid bath in the quench tank 42. Thus drill bits are alternately heat treated and quenched. An operator merely places the forged drill bits on the shelves 54 and 55. The heat treatment and quenching operations are automatic. Provision may also be made for moving the forged drill bits into position on the shelves 54 and 55 automatically without the aid of an operator.

While I have referred to high frequency heating of the slugs, I desire that it be understood that high frequency heating may be applied directly to the stock from which the slugs are subsequently cut. Moreover, my improved method is applicable to bits of various shapes and construction and may be applied to bits which do not have the extra long wings and which may be resharpened by grinding rather than reforging and grinding. Moreover, various methods of associating the high frequency coil with the bits may be employed. In certain instances it may be desirable to encircle the head of the bit by a high frequency coil manipulated manually.

The drill bit of my invention and the method of manufacturing the same have been found efficient and practical. I realize however that modifications may be made and I intend no limitations upon my invention other than may be imposed by the scope of the appended claims.

What I claim as new and desire to secure by Letters Patent of the United States is as follows:

1. A construction of percussive drill comprising in combination with a bit and a drill rod, a bit having a forged cutting head and a socket connected therewith, said socket being formed of relatively deformable material and normally having curved annular convex shaped internal walls, said drill rod having a hardened surface adapted to establish intimate continuous contact with the curved convex inner walls of the socket throughout substantially the entire surface thereof, the said deformable walls tending to forcibly expand with respect to the surface of the drill rod so that the walls of the socket become parallel and frictionally grip the non-deformable end of the drill rod.

2. In a percussive drill, a drill bit and a drill rod, said drill bit comprising a forged cutting head of relatively non-deformable material and a socket of relatively deformable material, a drill rod having an end portion of relatively non-deformable material, said socket having curved annular convex shaped internal and deformable walls which upon insertion of the non-deformable end of said drill rod tend to intimately contact the end of the drill rod in continuous annular zones throughout substantially the entire non-deformable end thereof for establishing a frictional connection therebetween.

3. A percussive drill comprising a drill bit and a drill rod, said drill rod having a substantially non-deformable end portion and said drill bit having a substantially non-deformable cutting face and a deformable socket portion varying in transverse section from maximum dimensions at opposite ends of the socket to a minimum dimension centrally of the socket, and means disposed internally of said socket portion and externally of said drill rod for insuring a continuous annular interconnection between the end of the drill rod and the socket of the drill bit.

4. A percussive drill comprising a drill bit having a substantially non-deformable cutting head and a relatively deformable socket connected therewith, said socket having internal diameters of substantially equal section at opposite ends thereof symmetrically spaced from a central section of smaller diameter, a drill rod having a relatively non-deformable end portion projectible into the relatively deformable socket, and coacting surfaces extending in intimate continuous contact between the non-deformable end of the drill rod and the relatively deformable socket of the drill bit for preventing rotative movement therebetween.

5. A percussive drill comprising a drill bit having a substantially non-deformable cutting head and a relatively deformable socket-like portion connected therewith, a drill rod having a relatively non-deformable end portion, the walls of said socket-like portion tapering in transverse section from a minimum diameter at substantially one-half the depth of said socket-like portion to a maximum diameter at each end thereof and being constructed for relative transverse continuous annular displacement as the end of the non-deformable drill rod is introduced into the socket-like portion for establishing a continuous annular connection between the end of the drill rod and said socket-like portion and preventing relative rotative movement therebetween.

6. A percussive drill comprising a drill bit having a substantially non-deformable cutting head and a relatively deformable socket connected therewith, said socket including a multiplicity of longitudinally extending rib-like portions substantially V-shaped in structure with the open portion of the V facing toward the center of the socket, the section of the wall being reduced at the apex of each of said V-shaped structures whereby the walls of the socket may spread within limits, and a drill rod having a non-deformable end adapted to enter said socket and establish intimate surface contact with the interior wall of said socket whereby a frictional connection is effected between the drill bit and the drill rod.

7. A percussive drill comprising a drill bit having a cutting head of substantially non-deformable material, a substantially cylindrical sleeve of relatively deformable material connected with said drill bit, said sleeve including a multiplicity of longitudinally extending rib-like portions of reduced section for imparting radial yieldability to said sleeve, said substantially cylindrical sleeve having internal diametrically opposed flattened faces, a drill rod having a substantially non-deformable end portion and carrying flattened faces thereon coacting with the internal flattened faces in said substantially cylindrical sleeve whereby the non-deformable end of the drill rod when introduced into the deformable sleeve establishes intimate surface contact with the interior surface of said substantially cylindrical sleeve for effecting a substantially non-rotative connection with the drill bit.

GRIFFITH ANNESLEY.